US011350238B2

(12) United States Patent
Wootton et al.

(10) Patent No.: US 11,350,238 B2
(45) Date of Patent: May 31, 2022

(54) SYSTEMS AND METHODS FOR DETECTING THE PRESENCE OF A USER AT A COMPUTER

(71) Applicant: Ivani, LLC, Dardenne Prairie, MO (US)

(72) Inventors: Matthew Wootton, O'Fallon, MO (US); Boris Dieseldorff, St. Charles, MO (US)

(73) Assignee: Ivani, LLC, Dardenne Prairie, MO (US)

( * ) Notice: Subject to any disclaimer, the term of this patent is extended or adjusted under 35 U.S.C. 154(b) by 39 days.

(21) Appl. No.: 16/298,530

(22) Filed: Mar. 11, 2019

(65) Prior Publication Data
US 2019/0215653 A1 Jul. 11, 2019

Related U.S. Application Data

(63) Continuation-in-part of application No. 16/053,761, filed on Aug. 2, 2018, now Pat. No. 10,397,742, (Continued)

(51) Int. Cl.
*H04W 24/00* (2009.01)
*H04W 4/02* (2018.01)
(Continued)

(52) U.S. Cl.
CPC ............ *H04W 4/023* (2013.01); *G01V 3/12* (2013.01); *H04B 17/318* (2015.01);
(Continued)

(58) Field of Classification Search
CPC .......... G01S 5/01; G01S 5/011; G01S 5/0295; G01S 5/02; G06F 21/62; H01H 2239/07
See application file for complete search history.

(56) References Cited

U.S. PATENT DOCUMENTS 4,054,879 A 10/1977 Wright et al.
4,649,388 A 3/1987 Atlas
(Continued)

FOREIGN PATENT DOCUMENTS

CA 2834522 A1 5/2014
CA 2945702 A1 8/2015
(Continued)

OTHER PUBLICATIONS

International Search Report, International Patent Application No. PCT/US2018/047555, dated Nov. 13, 2018 (10 pages).
(Continued)

*Primary Examiner* — Shantell L Heiber
(74) *Attorney, Agent, or Firm* — Lewis Rice LLC

(57) ABSTRACT

Systems and methods for securing an unattended computer. The systems and methods provide an additional layer of security for computer systems by using network presence sensing (NPS) to detect the presence or absence of a user physically present at a computer system and if an authorized user is detected as having departed, taking a security action in response. The response may be to lock the computer, encrypted sensitive data, and so forth. The concept may also be applied at a facilities level, in computing pools, and in other instances physical presence or absence of a user at a computer is indicative of a need for a change in system state. This change could be security related, or could pertain to other resources.

20 Claims, 7 Drawing Sheets

Related U.S. Application Data which is a continuation of application No. 15/600,380, filed on May 19, 2017, now Pat. No. 10,064,013, which is a continuation of application No. 15/227,717, filed on Aug. 3, 2016, now Pat. No. 9,693,195, which is a continuation of application No. 15/084,002, filed on Mar. 29, 2016, now Pat. No. 9,474,042.

(60) Provisional application No. 62/252,954, filed on Nov. 9, 2015, provisional application No. 62/219,457, filed on Sep. 16, 2015.

(51) Int. Cl.
| | |
|---|---|
| *H04L 5/00* | (2006.01) |
| *H04L 1/00* | (2006.01) |
| *H04B 17/318* | (2015.01) |
| *H04W 4/33* | (2018.01) |
| *H04W 4/30* | (2018.01) |
| *H04W 4/80* | (2018.01) |
| *G01V 3/12* | (2006.01) |
| *H04W 64/00* | (2009.01) |
| *H04W 12/00* | (2021.01) |

(52) U.S. Cl.
CPC ............ *H04L 1/0018* (2013.01); *H04L 5/006* (2013.01); *H04W 4/30* (2018.02); *H04W 4/33* (2018.02); *H04W 4/80* (2018.02); *H04W 12/00* (2013.01); *H04W 64/00* (2013.01)

(56) References Cited

U.S. PATENT DOCUMENTS

| | | | |
|---|---|---|---|
| 4,740,045 A | 4/1988 | Goodson et al. | |
| 5,270,720 A | 12/1993 | Stove | |
| 5,563,455 A | 10/1996 | Cheng | |
| 5,696,514 A | 12/1997 | Nathanson et al. | |
| 6,075,797 A | 6/2000 | Thomas | |
| 6,493,380 B1 | 12/2002 | Wu et al. | |
| 6,539,483 B1 | 3/2003 | Harrison et al. | |
| 6,573,861 B1 | 6/2003 | Hommel et al. | |
| 6,693,536 B2 | 2/2004 | Bauer, Jr. et al. | |
| 7,047,015 B2 | 5/2006 | Hawe | |
| 7,295,109 B2 | 11/2007 | Kobayashi | |
| 7,317,419 B2 | 1/2008 | Sugar et al. | |
| 7,423,576 B2 | 9/2008 | Sahinoglu et al. | |
| 7,652,617 B2 | 1/2010 | Kurtz et al. | |
| 7,663,325 B2 | 2/2010 | McDonough et al. | |
| 7,733,220 B2 | 6/2010 | Libby | |
| 8,138,918 B2 | 3/2012 | Habib et al. | |
| 8,274,386 B1 | 9/2012 | Dea et al. | |
| 8,354,925 B1 | 1/2013 | Libby et al. | |
| 8,402,543 B1 | 3/2013 | Ranjan et al. | |
| 8,456,304 B2 | 6/2013 | van Doorn et al. | |
| 8,502,666 B1 * | 8/2013 | Tam .................... | G01V 3/12 340/561 |
| 8,531,134 B2 | 9/2013 | Chemel et al. | |
| 8,536,998 B1 | 9/2013 | Siu et al. | |
| 8,552,664 B2 | 10/2013 | Chemel et al. | |
| 8,555,388 B1 | 10/2013 | Wang et al. | |
| 8,593,264 B2 | 11/2013 | Umezawa et al. | |
| 8,624,734 B2 | 1/2014 | Inomata et al. | |
| 8,682,812 B1 | 3/2014 | Ranjan | |
| 8,762,298 B1 | 6/2014 | Ranjan et al. | |
| 8,766,556 B2 | 7/2014 | Meyer | |
| 8,793,790 B2 | 7/2014 | Khurana et al. | |
| 8,818,288 B2 | 8/2014 | Patwari et al. | |
| 8,836,344 B2 | 9/2014 | Habib et al. | |
| 8,842,010 B2 | 9/2014 | Cehelnik | |
| 8,844,038 B2 | 9/2014 | Niemela | |
| 8,849,471 B2 | 9/2014 | Daniel et al. | |
| 8,984,581 B2 | 3/2015 | Luna et al. | |
| 9,143,413 B1 | 9/2015 | Manku et al. | |
| 9,143,968 B1 | 9/2015 | Manku et al. | |
| 9,144,041 B2 | 9/2015 | Curtis et al. | |
| 9,185,121 B2 | 11/2015 | Chari et al. | |
| 9,245,426 B2 | 1/2016 | Caicedo Fernandez et al. | |
| 9,369,476 B2 | 6/2016 | Chekina et al. | |
| 9,378,361 B1 | 6/2016 | Yen et al. | |
| 9,407,663 B1 | 8/2016 | Pauley, Jr. et al. | |
| 9,413,839 B2 | 8/2016 | Annan et al. | |
| 9,523,760 B1 | 12/2016 | Kravets et al. | |
| 9,524,628 B1 | 12/2016 | Omer et al. | |
| 9,584,974 B1 | 2/2017 | Omer et al. | |
| 9,693,195 B2 | 6/2017 | Wootton et al. | |
| 9,743,294 B1 | 8/2017 | Omer et al. | |
| 9,900,794 B2 | 2/2018 | Han et al. | |
| 9,980,020 B1 | 5/2018 | Sharp et al. | |
| 10,064,013 B2 | 8/2018 | Wootton et al. | |
| 2003/0108119 A1 | 6/2003 | Mohebbi et al. | |
| 2004/0080415 A1 | 4/2004 | Sorenson | |
| 2004/0196140 A1 | 10/2004 | Sid | |
| 2005/0055568 A1 | 3/2005 | Agrawala et al. | |
| 2005/0083199 A1 | 4/2005 | Hall et al. | |
| 2006/0037077 A1 | 2/2006 | Gadde et al. | |
| 2006/0217132 A1 | 9/2006 | Drummond-Murray et al. | |
| 2007/0133487 A1 | 6/2007 | Wang et al. | |
| 2007/0225000 A1 | 9/2007 | Cleveland | |
| 2007/0283002 A1 | 12/2007 | Bornhoevd et al. | |
| 2008/0062940 A1 | 3/2008 | Othmer et al. | |
| 2008/0119130 A1 | 5/2008 | Sinha | |
| 2008/0148398 A1 | 6/2008 | Mezack et al. | |
| 2008/0214111 A1 | 9/2008 | Moshir et al. | |
| 2008/0240008 A1 | 10/2008 | Backes et al. | |
| 2008/0303655 A1 | 12/2008 | Johnson | |
| 2008/0318564 A1 | 12/2008 | Kreiner et al. | |
| 2009/0040952 A1 | 2/2009 | Cover et al. | |
| 2009/0062696 A1 | 3/2009 | Nathan et al. | |
| 2009/0184804 A1 | 7/2009 | Seppa | |
| 2009/0256483 A1 | 10/2009 | Gehman et al. | |
| 2009/0284245 A1 | 11/2009 | Kirby et al. | |
| 2010/0125897 A1 | 5/2010 | Jain et al. | |
| 2010/0141437 A1 | 6/2010 | Karam et al. | |
| 2010/0145545 A1 | 6/2010 | Mosebrook et al. | |
| 2010/0265093 A1 | 10/2010 | Cho et al. | |
| 2010/0315284 A1 | 12/2010 | Trizna et al. | |
| 2010/0328492 A1 | 12/2010 | Fedorovskaya et al. | |
| 2011/0130092 A1 | 6/2011 | Yun | |
| 2011/0141647 A1 | 6/2011 | Garcia et al. | |
| 2011/0153811 A1 | 6/2011 | Jeong et al. | |
| 2011/0211563 A1 | 9/2011 | Herrala et al. | |
| 2011/0260871 A1 | 10/2011 | Karkowski | |
| 2011/0309931 A1 | 12/2011 | Rose | |
| 2012/0009882 A1 | 1/2012 | Patwari et al. | |
| 2012/0046003 A1 | 2/2012 | Ying | |
| 2012/0092060 A1 | 4/2012 | Ganesan | |
| 2012/0115512 A1 | 5/2012 | Grainger et al. | |
| 2012/0146788 A1 | 6/2012 | Wilson et al. | |
| 2012/0181865 A1 | 7/2012 | Muthu | |
| 2012/0184296 A1 | 7/2012 | Milosiu et al. | |
| 2012/0207481 A1 | 8/2012 | Elberbaum | |
| 2012/0207484 A1 | 8/2012 | Hunt | |
| 2013/0067566 A1 | 3/2013 | Oh | |
| 2013/0090151 A1 | 4/2013 | Ngai et al. | |
| 2013/0162459 A1 | 6/2013 | Aharony et al. | |
| 2013/0175863 A1 | 7/2013 | Pan | |
| 2013/0260602 A1 | 10/2013 | German et al. | |
| 2013/0283256 A1 | 10/2013 | Proud | |
| 2014/0004874 A1 | 1/2014 | Schwartz et al. | |
| 2014/0015706 A1 | 1/2014 | Ishihara et al. | |
| 2014/0087752 A1 | 3/2014 | Zhu et al. | |
| 2014/0128778 A1 | 5/2014 | Chan et al. | |
| 2014/0135042 A1 | 5/2014 | Buchhein et al. | |
| 2014/0140231 A1 | 5/2014 | Haiut et al. | |
| 2014/0165207 A1 | 6/2014 | Engel et al. | |
| 2014/0247179 A1 | 9/2014 | Furuskog et al. | |
| 2014/0286380 A1 | 9/2014 | Prager et al. | |
| 2014/0312128 A1 | 10/2014 | Matsuoka et al. | |
| 2014/0330960 A1 | 11/2014 | Haga et al. | |
| 2015/0005900 A1 | 1/2015 | Steele et al. | |
| 2015/0022123 A1 | 1/2015 | Van De Sluis et al. | |
| 2015/0043377 A1 | 2/2015 | Cholas et al. | |
| 2015/0049745 A1 | 2/2015 | Han et al. | |

(56) References Cited

U.S. PATENT DOCUMENTS

| | | |
|---|---|---|
| 2015/0049792 A1 | 2/2015 | Han et al. |
| 2015/0059248 A1 | 3/2015 | Iwata et al. |
| 2015/0069242 A1 | 3/2015 | Alameh et al. |
| 2015/0078295 A1 | 3/2015 | Mandyam et al. |
| 2015/0098377 A1 | 4/2015 | Amini et al. |
| 2015/0143454 A1 | 5/2015 | Lee et al. |
| 2015/0187192 A1 | 7/2015 | Tabe |
| 2015/0195100 A1 | 7/2015 | Imes et al. |
| 2015/0212205 A1 | 7/2015 | Shpater |
| 2015/0236848 A1 | 8/2015 | Ma et al. |
| 2015/0245164 A1 | 8/2015 | Merrill |
| 2015/0257167 A1 | 9/2015 | Chen et al. |
| 2015/0282081 A1* | 10/2015 | Oren .................. H04W 52/0219 455/574 |
| 2015/0295808 A1 | 10/2015 | O'Malley et al. |
| 2015/0301173 A1 | 10/2015 | Vangeel et al. |
| 2015/0338507 A1 | 11/2015 | Oh et al. |
| 2015/0344265 A1 | 12/2015 | Hakonen et al. |
| 2015/0348007 A1* | 12/2015 | Khan .................... G06Q 20/321 705/44 |
| 2016/0018508 A1 | 1/2016 | Chen et al. |
| 2016/0021485 A1 | 1/2016 | Sallas et al. |
| 2016/0028763 A1 | 1/2016 | Cruz Mota et al. |
| 2016/0035196 A1 | 2/2016 | Chan |
| 2016/0050182 A1 | 2/2016 | Edross |
| 2016/0050224 A1 | 2/2016 | Ricafort et al. |
| 2016/0100046 A1 | 4/2016 | Meru et al. |
| 2016/0104365 A1* | 4/2016 | Henderson ............. G08B 21/22 340/686.6 |
| 2016/0105278 A1* | 4/2016 | Huang .................. H04L 9/0816 713/182 |
| 2016/0161339 A1 | 6/2016 | Tan |
| 2016/0183059 A1 | 6/2016 | Nagy et al. |
| 2016/0187475 A1 | 6/2016 | Horng et al. |
| 2016/0189532 A1 | 6/2016 | Malhotra et al. |
| 2016/0210838 A1 | 7/2016 | Yan et al. |
| 2016/0234167 A1 | 8/2016 | Engel et al. |
| 2016/0241999 A1 | 8/2016 | Chin et al. |
| 2016/0261986 A1 | 9/2016 | Nord |
| 2016/0301543 A1 | 10/2016 | Minezawa et al. |
| 2016/0335861 A1 | 11/2016 | Shimura |
| 2016/0371959 A1 | 12/2016 | Henderson et al. |
| 2017/0024574 A1* | 1/2017 | Agrawal .................. G06F 21/31 |
| 2017/0146656 A1 | 5/2017 | Belsley et al. |
| 2017/0257744 A1 | 9/2017 | Wootton et al. |
| 2017/0343658 A1 | 11/2017 | Ramirez et al. |
| 2017/0366938 A1 | 12/2017 | Wootton et al. |
| 2018/0026481 A1 | 1/2018 | Ku et al. |
| 2018/0131554 A1 | 5/2018 | Liu et al. |

FOREIGN PATENT DOCUMENTS

| | | |
|---|---|---|
| CN | 101013522 A | 8/2007 |
| CN | 101184353 A | 5/2008 |
| CN | 101346640 A | 1/2009 |
| CN | 101436336 A | 5/2009 |
| CN | 201319687 Y | 9/2009 |
| CN | 201467534 U | 5/2010 |
| CN | 201639825 U | 11/2010 |
| CN | 201839492 U | 5/2011 |
| CN | 102131327 A | 7/2011 |
| CN | 102331302 A | 1/2012 |
| CN | 202475882 U | 10/2012 |
| CN | 102883360 A | 1/2013 |
| CN | 202738203 U | 2/2013 |
| CN | 202759621 U | 2/2013 |
| CN | 203241317 U | 10/2013 |
| CN | 203243557 U | 10/2013 |
| CN | 203251317 U | 10/2013 |
| CN | 103458413 A | 12/2013 |
| CN | 103596266 A | 2/2014 |
| CN | 104459688 A | 3/2015 |
| CN | 104502982 A | 4/2015 |
| CN | 104835277 A | 8/2015 |
| EP | 1829003 B1 | 11/2013 |
| JP | H01162186 A | 6/1989 |
| JP | 2005136532 A | 5/2005 |
| JP | 2005535950 A | 11/2005 |
| JP | 2006129098 A | 5/2006 |
| JP | 2007159370 A | 6/2007 |
| JP | 2008305800 A | 12/2008 |
| JP | 2009229318 A | 10/2009 |
| JP | 2011109784 A | 6/2011 |
| JP | 2012190161 A | 10/2012 |
| JP | 201552475 A | 3/2015 |
| JP | 2015052475 A | 3/2015 |
| JP | 2015527573 A | 9/2015 |
| JP | 2015222173 A | 12/2015 |
| JP | 2016206851 A | 12/2016 |
| KR | 100887425 B1 | 3/2009 |
| KR | 100912039 B1 | 8/2009 |
| KR | 20090113941 A | 11/2009 |
| KR | 101009613 B1 | 1/2011 |
| KR | 20130012996 A | 2/2013 |
| KR | 20130017298 A | 2/2013 |
| KR | 20140025207 A | 3/2014 |
| KR | 20140080755 A | 7/2014 |
| KR | 20140120748 A | 10/2014 |
| RS | 20130027 A1 | 6/2014 |
| WO | 2011062445 A2 | 5/2011 |
| WO | 2012004420 A1 | 1/2012 |
| WO | 2012010170 A1 | 1/2012 |
| WO | 2014021574 A1 | 2/2014 |
| WO | 2014026226 A1 | 2/2014 |
| WO | 2014109486 A1 | 7/2014 |
| WO | 2014135738 A1 | 9/2014 |
| WO | 2014201574 A1 | 12/2014 |
| WO | 2015035830 A1 | 3/2015 |
| WO | 2015117566 A1 | 8/2015 |
| WO | 2015168700 A1 | 11/2015 |
| WO | 2017078811 A2 | 5/2017 |

OTHER PUBLICATIONS

International Search Report, International Patent Application No. PCT/US2018/045835, dated Nov. 20, 2018 (21 pages).

Extended European Search Report, Application No. EP 16862628, dated Apr. 8, 2019 (8 pages).

Office Action issued in PRC (China) Patent Application No. 201680062704.9, dated Apr. 15, 2019 (11 pages).

International Search Report, International Patent Application No. PCT/US2015/013127, dated Apr. 24, 2015 (10 pages).

International Search Report, International Patent Application No. PCT/US2015/058019, dated Feb. 5, 2016 (10 pages).

International Search Report, International Patent Application No. PCT/US2015/057869, dated Feb. 5, 2016 (10 pages).

International Search Report, International Patent Application No. PCT/US2016/016836, dated May 24, 2016 (12 pages).

International Search Report, International Patent Application No. PCT/US2016/045611, dated May 16, 2017, (10 pages).

Adib, Fadel et al., "See Through Walls with Wi-Fi!", ACM SIGCOMM Computer Communication Review, Oct. 2013, vol. 43, Issue 4, pp. 75-86 (12 pages).

International Search Report and Written Opinion issued for related Application No. PCT/US2020/020992, dated Jul. 22, 2020, 10 pages.

Youssef, Moustafa, et al., "Challenges: Device-free Passive Localization for Wireless Environments", Mobicom 2007 Proceedings of the 13th Annual ACM International Conference on Mobile Computing and Networking, held on Sep. 9-14, 2007, in Montreal, Quebec, Canada, pp. 222-229 (8 pages).

NETGEAR®, "N600 WiFi Cable Modem Router, Model C3700 User Manual", dated Mar. 2014 (101 pages).

OpenWRT, "Wireless Configuration", https://web.archive.org/web/20140402033233/http://wiki.openwrt.org/doc/uci/wireless (capture of URL http://wiki.openwrt.org/doc/uci/wireless on Apr. 2, 2014), printed on Jan. 25, 2018 (10 pages).

Japan Radio Co., Ltd; "26GHz FWA—Technology"; http://www.jrc.co.jp/eng/product/lineup/26ghz_wireless_ip_access_system/tech.html, printed on Jan. 25, 2018 (3 pages).

(56) References Cited

OTHER PUBLICATIONS

Apple Insider; "Intel to reportedly supply LTE chips for 2016 iPhone"; http://appleinsider.com/articles/15/03/11/intel-to-reportedly-supply-lte-chips-for-2016-iphone, published Nov. 3, 2015, printed on Jan. 25, 2018 (9 pages).
CEVA; CEVA's DSP Cores Power the World's Leading Mobile Broadband and M2M Applications; http://www.ceva-dsp.com/Mobile-Broadband; May 15, 2016, printed on Jan. 25, 2018 (3 pages).
quora.com; "What is the function of the baseband processor in wireless devices?"; https://www.quora.com/What-is-the-function-of-the-baseband-processor-in-wireless-devices; May 15, 2016, printed on Jan. 25, 2018 (2 pages).
Wikipedia; "Baseband processor", rhttps://en.wikipedia.org/wiki/Bandband_processor; 2 pages; version dated Apr. 19, 2016, printed on Jan. 25, 2018 (1 page).
European Search Report issued for European Application No. EP20166495.0, dated Sep. 8, 2020, 5 pages.
International Search Report and Written Opinion issued for International Application No. PCT/IB2020/000143, dated Jul. 22, 2020, 10 pages.
European Search Report and Written Opinion for Application No. PCT/19US/014197, dated Sep. 1, 2021, 8 pages.
China National Intellectual Property Administration, First Office Action and Search Report, dated Dec. 30, 2021, 3 pages.
Intellectual Property India, The Patent Office, Examination Report, emailed Mar. 18, 2022, 7 pages.

\* cited by examiner

SYSTEMS AND METHODS FOR DETECTING THE PRESENCE OF A USER AT A COMPUTER

CROSS-REFERENCE TO RELATED APPLICATIONS

This application is a Continuation in Part (CIP) of U.S. Utility patent application Ser. No. 16/053,761, filed Aug. 2, 2018, which is a Continuation of U.S. Utility patent application Ser. No. 15/600,380, filed May 19, 2017 and now U.S. Pat. No. 10,064,013, which is a Continuation of U.S. Utility patent application Ser. No. 15/227,717, filed Aug. 3, 2016 and now U.S. Pat. No. 9,693,195, which is a Continuation of U.S. Utility patent application Ser. No. 15/084,002, filed Mar. 29, 2016 and now U.S. Pat. No. 9,474,042. U.S. Utility patent application Ser. No. 15/227,717 also claims the benefit of U.S. Provisional Patent Application Ser. No. 62/252,954, and U.S. Provisional Patent Application Ser. No. 62/219,457. The entire disclosure of all the above documents is herein incorporated by reference.

BACKGROUND OF THE INVENTION

Field of the Invention

This disclosure is related to the field of computer security. In particular, it relates to the use of networking equipment to secure a computer system and/or detect an intruder within a detection area.

Description of the Related Art

Computer security, sometimes colloquially known as cybersecurity, is the protection of the integrity or safety of computers, particularly from theft or damage of hardware, software, or information or data. This includes interference with normal computer operation, such as through denial-of-service attacks, or other disruption or misdirection of services provided or made available by computer systems.

One common way computer systems are compromised is by gaining unauthorized access to the computer and then deploying hidden malware on the compromised machine. Such malware may, for example, scan the device for valuable confidential information and acquire credentials for access to financial accounts. This data is then transmitted from the infected machine to the hacker. Other malware uses compromised machines to form a botnet and then attack other systems over a network. Still other malware uses a compromised computer to mine cryptocurrency. These attacks have one feature in common in that they rely on the use of networking hardware to complete the attack.

Most malware is initially installed due to unpatched security flaws, authorized users improperly providing access, or a combination of those. "Hacking" is sometimes dramatized as sophisticated computer programmers using specialized software or hardware systems to break into secured computers; in reality, hacking is more often accomplished by tricking a person who already has secure access into voluntarily providing access, which can range from providing confidential authentication credentials to improperly hitting "ok" on a prompt. Another way to gain unauthorized access is to use a known attack on a large set of computers and simply accept that computers with up-to-date security patches will be immune. The cost and effort involved in hacking a system with a custom hack is generally prohibitive, so these easier, more reliable and faster hacks are preferred. In the case of the authorized user that is tricked into providing credentials, it is often also difficult to track and nearly impossible to prevent. Because modern computer systems, properly maintained, are very difficult to hack, methods that don't have to subvert a properly maintained modern security system are preferred.

Another way malware may initially be installed is for someone to install it on an unattended computer. Computer systems may be accessible while unattended in any number of circumstances. For example, a computer may be left unattended in a public place for a short period of time, such as while the user is refilling a drink at a coffee shop, or using the bathroom. Additionally, many publicly accessible computers can be found unattended at libraries, universities, and other similar types of locations.

There is a need in the art to diminish the ability of an attacker to use initial access to a computer system to further attack said computer or, as part of a botnet, other computers.

SUMMARY OF THE INVENTION

The following is a summary of the invention in order to provide a basic understanding of some aspects of the invention. This summary is not intended to identify key or critical elements of the invention or to delineate the scope of the invention. The sole purpose of this section is to present some concepts of the invention in a simplified form as a prelude to the more detailed description that is presented later.

Because of these and other problems in the art, described herein, among other things, is a method for securing an unattended computer system comprising: providing a computer having a radio transceiver; providing a human user in physical proximity to the computer to use the computer; the human user manipulating the computer to provide authentication credentials for the human user to access the computer; validating, at the computer, the authentication credentials; detecting, when the authentication credentials are validated, the physical proximity to the computer of the human user, the detecting comprising network presence sensing using the radio transceiver; repeating the detecting step until the human user is no longer detected in physical proximity to use the computer; and after the human user is no longer detected in physical proximity to use the computer, detecting that the detected user is no longer in physical proximity to use the computer, securing the computer from unauthorized use.

In a further embodiment of the method, securing the computer from unauthorized use comprises the computer executing a security action.

In a further embodiment of the method, the security action is selected from the group consisting of: locking the computer; setting the computer to sleep mode; disabling the radio transceiver; disabling network hardware of the computer; disabling access to a digital wallet; disabling a storage medium; encrypting data stored at the computer; and deleting data stored at the computer.

In a further embodiment of the method, the disabling the radio transceiver comprises discontinuing electric power to the radio transceiver or network hardware, and the disabling the network hardware of the computer comprises discontinuing electric power to the network hardware.

In a further embodiment of the method, the method further comprises: after the securing the computer from unauthorized use, a second human user manipulating the computer to provide second authentication credentials for the second human user to access the computer; determining that the second authentication credentials are invalid; after the determining that the second authentication credentials are invalid, further securing the computer from unauthorized use.

In a further embodiment of the method, the human user and the second human user are not the same.

In a further embodiment of the method, the further securing the computer from unauthorized use comprises the computer executing a security action.

In a further embodiment of the method, the security action is selected from the group consisting of: locking the computer; setting the computer to sleep mode; disabling the radio transceiver; disabling network hardware of the computer; disabling access to a digital wallet; disabling a storage medium; encrypting data stored at the computer; and deleting data stored at the computer.

In a further embodiment of the method, the disabling the radio transceiver comprises discontinuing electric power to the radio transceiver or network hardware, and the disabling the network hardware of the computer comprises discontinuing electric power to the network hardware.

Also described herein, among other things, is a system for securing an unattended computer system comprising: a computer having a manually operable interface for receiving user input, a radio transceiver, a microprocessor, and a non-transitory, computer-readable storage medium having stored thereon program instructions which, when executed by the microprocessor, cause the computer to perform the steps of: receiving, via the interface, user input comprising authentication credentials for a human user to access the computer; validating the authentication credentials; detecting, when the authentication credentials are validated, the physical proximity to the computer of the human user, the detecting comprising network presence sensing using the radio transceiver; repeating the detecting step until the human user is no longer detected in physical proximity to use the computer; and after the human user is no longer detected in physical proximity to use the computer, securing the computer from unauthorized use.

In a further embodiment of the system, the securing the computer from unauthorized use comprises the computer executing a security action.

In a further embodiment of the system, the security action is selected from the group consisting of: locking the computer; setting the computer to sleep mode; disabling the radio transceiver; disabling network hardware of the computer; disabling access to a digital wallet; disabling a storage medium; encrypting data stored at the computer; and deleting data stored at the computer.

In a further embodiment of the system, the disabling the radio transceiver comprises discontinuing electric power to the radio transceiver or network hardware, and the disabling the network hardware of the computer comprises discontinuing electric power to the network hardware.

In a further embodiment of the system, the program instructions, when executed by the microprocessor, further cause the computer to perform the steps of: after the securing the computer from unauthorized use, receiving, via the interface, second user input comprising second authentication credentials for a second human user to access the computer; determining that the second authentication credentials are invalid; and after the determining that the second authentication credentials are invalid, further securing the computer from unauthorized use.

In a further embodiment of the system, the further securing the computer from unauthorized use comprises the computer executing a security action.

In a further embodiment of the system, the security action is selected from the group consisting of: locking the computer; setting the computer to sleep mode; disabling the radio transceiver; disabling network hardware of the computer; disabling access to a digital wallet; disabling a storage medium; encrypting data stored at the computer; and deleting data stored at the computer.

In a further embodiment of the system, the disabling the radio transceiver comprises discontinuing electric power to the radio transceiver or network hardware, and the disabling the network hardware of the computer comprises discontinuing electric power to the network hardware.

DESCRIPTION OF THE PREFERRED EMBODIMENT(S)

Figure 1:
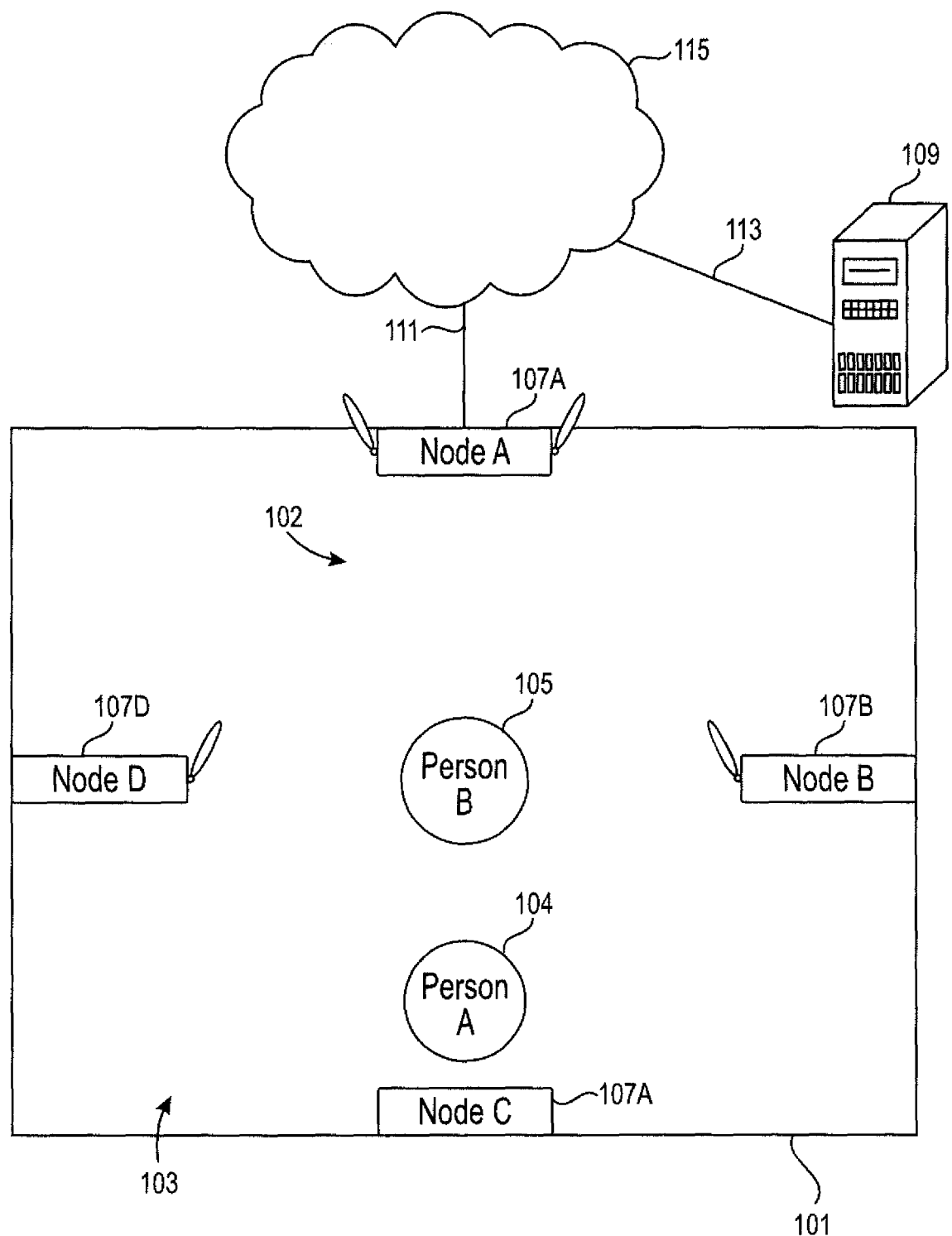
FIG. 1 is a schematic diagram of an embodiment of a network presence sensing (NPS) system.

The following detailed description and disclosure illustrates by way of example and not by way of limitation. This description will clearly enable one skilled in the art to make and use the disclosed systems and methods, and describes several embodiments, adaptations, variations, alternatives and uses of the disclosed systems and methods. As various changes could be made in the above constructions without departing from the scope of the disclosures, it is intended that all matter contained in the description or shown in the accompanying drawings shall be interpreted as illustrative and not in a limiting sense.

Throughout this disclosure, the term "computer" describes hardware which generally implements functionality provided by digital computing technology, particularly computing functionality associated with microprocessors. The term "computer" is not intended to be limited to any specific type of computing device, but it is intended to be inclusive of all computational devices including, but not limited to: processing devices, microprocessors, personal computers, desktop computers, laptop computers, workstations, terminals, servers, clients, portable computers, handheld computers, cell phones, mobile phones, smart phones, tablet computers, server farms, hardware appliances, minicomputers, mainframe computers, video game consoles, handheld video game products, and wearable computing devices including but not limited to eyewear, wristwear, pendants, fabrics, and clip-on devices.

As used herein, a "computer" is necessarily an abstraction of the functionality provided by a single computer device outfitted with the hardware and accessories typical of computers in a particular role. By way of example and not limitation, the term "computer" in reference to a laptop computer would be understood by one of ordinary skill in the art to include the functionality provided by pointer-based input devices, such as a mouse or track pad, whereas the term "computer" used in reference to an enterprise-class server would be understood by one of ordinary skill in the art to include the functionality provided by redundant systems, such as RAID drives and dual power supplies.

It is also well known to those of ordinary skill in the art that the functionality of a single computer may be distributed across a number of individual machines. This distribution may be functional, as where specific machines perform specific tasks; or, balanced, as where each machine is capable of performing most or all functions of any other machine and is assigned tasks based on its available resources at a point in time. Thus, the term "computer" as used herein, can refer to a single, standalone, self-contained device or to a plurality of machines working together or independently, including without limitation: a network server farm, "cloud" computing system, software-as-a-service, or other distributed or collaborative computer networks.

Those of ordinary skill in the art also appreciate that some devices which are not conventionally thought of as "computers" nevertheless exhibit the characteristics of a "computer" in certain contexts. Where such a device is performing the functions of a "computer" as described herein, the term "computer" includes such devices to that extent. Devices of this type include but are not limited to: network hardware, print servers, file servers, NAS and SAN, load balancers, and any other hardware capable of interacting with the systems and methods described herein in the matter of a conventional "computer."

Throughout this disclosure, the terms "media" and "medium" mean one or more volatile and/or non-volatile computer readable medium. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Throughout this disclosure, the term "software" refers to code objects, program logic, command structures, data structures and definitions, source code, executable and/or binary files, machine code, object code, compiled libraries, implementations, algorithms, libraries, or any instruction or set of instructions capable of being executed by a computer processor, or capable of being converted into a form capable of being executed by a computer processor, including without limitation virtual processors, or by the use of run-time environments, virtual machines, and/or interpreters. Those of ordinary skill in the art recognize that software can be wired or embedded into hardware, including without limitation onto a microchip, and still be considered "software" within the meaning of this disclosure. For purposes of this disclosure, software includes without limitation: instructions stored or storable in RAM, ROM, flash memory BIOS, CMOS, mother and daughter board circuitry, hardware controllers, USB controllers or hosts, peripheral devices and controllers, video cards, audio controllers, network cards, Bluetooth® and other wireless communication devices, virtual memory, storage devices and associated controllers, firmware, and device drivers. The systems and methods described here are contemplated to use computers and computer software typically stored in a computer- or machine-readable storage medium or memory.

Program code embodied on a computer readable medium may be transmitted using any appropriate medium, including but not limited to wireless, wireline, optical fiber cable, RF, etc., or any suitable combination of the foregoing.

Throughout this disclosure, the term "transmitter" refers to equipment, or a set of equipment, having the hardware, circuitry, and/or software to generate and transmit electromagnetic waves carrying messages, signals, data, or other information. A transmitter may also comprise the componentry to receive electric signals containing such messages, signals, data, or other information, and convert them to such electromagnetic waves. The term "receiver" refers to equipment, or a set of equipment, having the hardware, circuitry, and/or software to receive such transmitted electromagnetic waves and convert them into signals, usually electrical, from which the message, signal, data, or other information may be extracted. The term "transceiver" generally refers to a device or system that comprises both a transmitter and receiver, such as, but not necessarily limited to, a two-way radio, or wireless networking router or access point. For purposes of this disclosure, all three terms should be understood as interchangeable unless otherwise indicated; for example, the term "transmitter" should be understood to imply the presence of a receiver, and the term "receiver" should be understood to imply the presence of a transmitter.

For purposes of this disclosure, there will also be significant discussion of a special type of computer referred to as a "mobile communication device" or simply "mobile device". A mobile communication device may be, but is not limited to, a smart phone, tablet PC, e-reader, satellite navigation system ("SatNav"), fitness device (e.g. a Fitbit™ or Jawbone™) or any other type of mobile computer whether of general or specific purpose functionality. Generally speaking, a mobile communication device is network-enabled and communicating with a server system providing services over a telecommunication or other infrastructure network. A mobile communication device is essentially a mobile computer, but one which is commonly not associated with any particular location, is also commonly carried on a user's person, and usually is in near-constant real-time communication with a network.

This application should be understood with respect to the systems and methods for detecting the presence of a human within a detection network, or "Network Presence Sensing"

Figure 2:
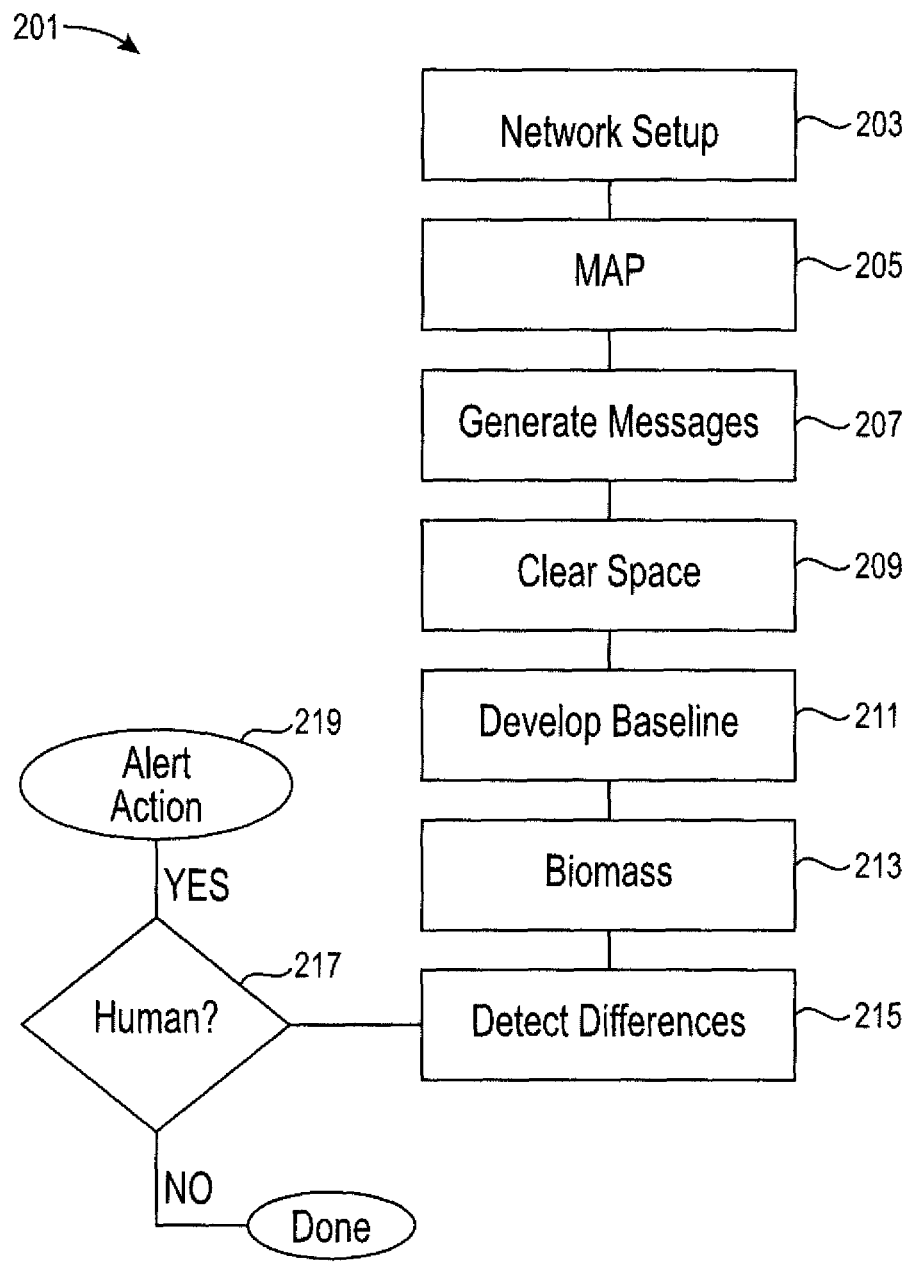
FIG. 2 is a flow chart of an embodiment of an NPS method.
Figure 3A:
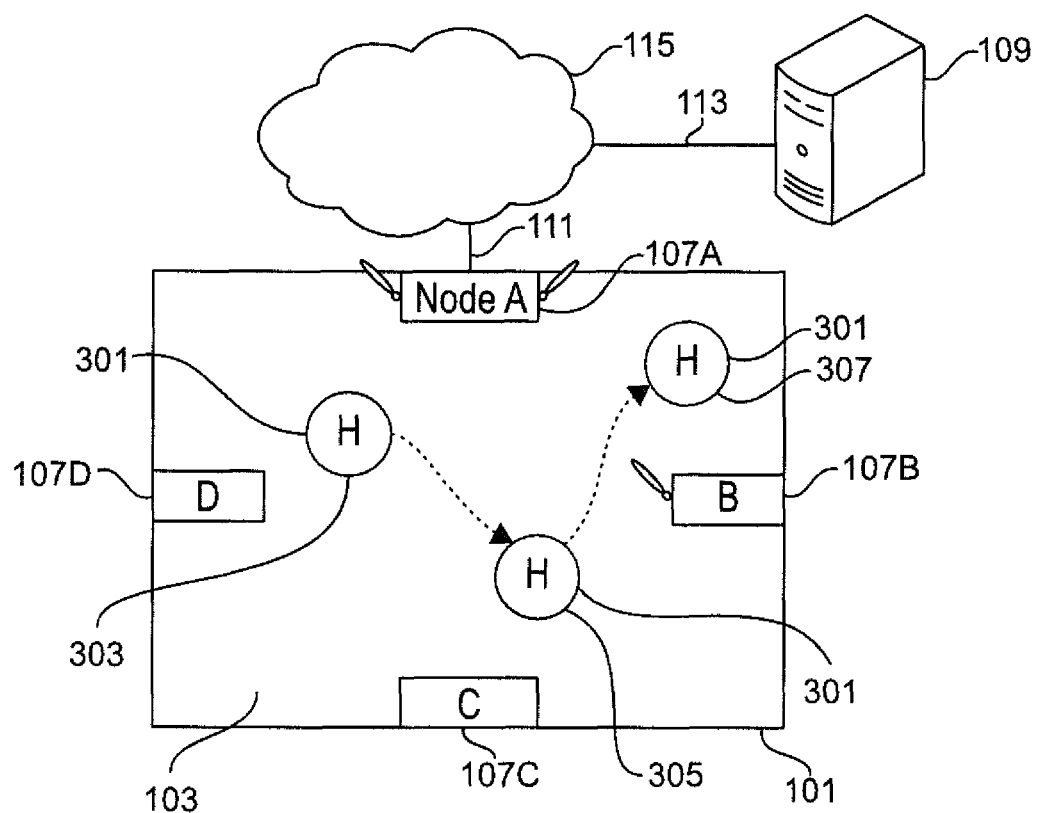
FIG. 3A depicts a schematic diagram of a system for change detection in a detection network over time.
Figure 3B:
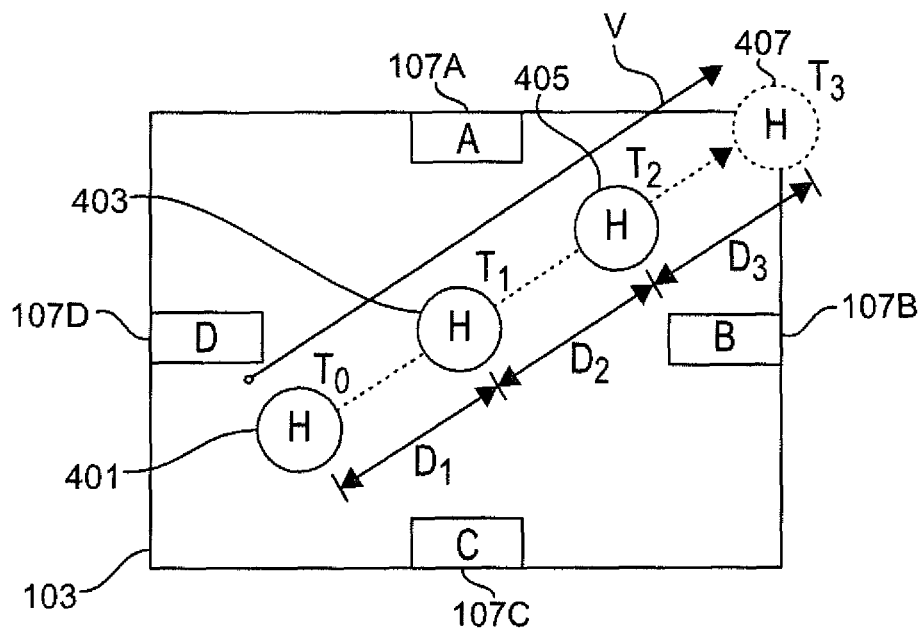
FIG. 3B depicts a schematic diagram of a system for detecting changes in locations of humans in a detection network over time.

(NPS) described in U.S. Utility patent application Ser. No. 15/674,328, filed Aug. 10, 2017, U.S. Utility patent application Ser. No. 15/600,380, filed May 19, 2017, U.S. Utility Pat. Nos. 9,693,195, 9,474,042, United States Provisional Patent Application No. 62/252,954, filed Nov. 9, 2015, and U.S. Provisional Patent Application No. 62/219,457, filed Sep. 16, 2015. This disclosures of all of these documents are incorporated herein by reference. Various aspects of these disclosures are discussed herein, including NPS, which is, at a high level, the inference of the presence of humans within a detection network based on changes in the characteristics of wireless network signals caused by the absorption of wireless waves caused by the water mass of the human body within the detection network. FIG. 1 is a schematic diagram of a system and method for NPS according to the above references. FIG. 2 depicts an embodiment (201) of a method for NPS according to the above references. FIGS. 3A and 3B depict embodiments of NPS using change detection according to the above references.

Described herein are systems and methods for providing an additional layer of security for computer systems, particularly when unattended. The systems and methods described herein use network presence sensing (NPS) technology to detect the presence or absence of a user at a computer system, and take action in response to secure the computer. At a high level, the basic components of the systems and methods described herein are determining physical motion, presence, or occupancy of a computer or computer system by a human, and then taking an action in response to secure that computer system. The particulars of NPS are set out in the patent applications mentioned above.

As will be understood by a person of ordinary skill in the art, most modern computers, and even many still-functional older computer systems, include some form of wireless network communication, such as a Wi-Fi™ or Bluetooth™ transceiver, which generally includes an antenna. The NPS technologies described in the above-referenced applications can be used in connection with these transceivers to detect the presence of a person within the detection network of the cards, and in connection with other devices associated therewith.

For example, many modern computer systems use short-range radio-based protocols, such as Bluetooth™, to connect a keyboard and mouse to the computer. It is also common to have peripherals, such as headphones, or wearable devices, such as pedometers or smartwatches, wirelessly paired with the computer. Typically, at least one wireless device is communicating wirelessly with a given computer in any given circumstance. These devices may be utilized to perform NPS as described herein. In a public space, for example, the computer is generally communicating via Wi-Fi™ with a wireless router managed by the venue. Alternatively, the computer may use a cellular or satellite data connection. This may be direct or via tethering, e.g., using data telecommunications connections of a separate device. Due to the close range required for a person to physically interact with the computer, the presence of the person is usually detectable by NPS.

Figure 4A:
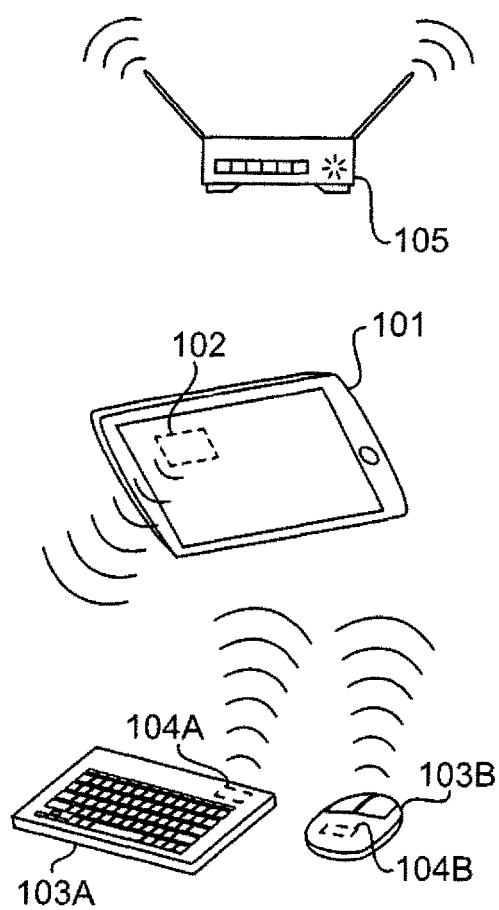
FIGS. 4A and 4B depict, respectively, an embodiment of a system and method for detecting presence of a human user at a computer and taking a security action.

The systems and methods described herein generally comprise a computer (101) of a user having at least one wireless transceiver (102) associated therewith. Typically, the transceiver (102) is part of the computer (101) as shown, but other relationships are possible. For example, the transceiver (102) could be externally separable connected, such as via USB. In the depicted embodiment of FIG. 4A, the transceiver (102) wirelessly transmits to at least one external device (103A) and/or (103B). This may be, by way of example and not limitation, a peripheral device such as a keyboard (103A) or mouse (103B) as depicted in FIG. 4A. Additionally, and/or alternatively, the transceiver (102) may communicate with a wireless network device (105). Such a device (105) may be, but is not necessarily limiting to, a wireless router (105), as depicted in FIG. 4A. The devices (103A) and (103B) in turn may have wireless transmitters (100A) and (100B), respectively.

In an embodiment, when an authorized user begins to use the computer (101), the user generally will initially authenticate (203) him or herself Authentication (203) may be through any means now known or later developed in the art. Presently, authentication typically comprises entering a user name and/or password, sometimes with an additional token, such as in a two-factor authentication scheme. Once authentication is complete, NPS may be used (205) to determine whether there is an individual currently present at the keyboard. In an embodiment, a determination may be made based on the timing of the authentication and the timing of the NPS detection (205), that the person currently at the keyboard is an authorized user. This inference may be drawn because correct authentication credentials were supplied at the time the person was detected by NPS (205). This status is then tracked or stored and presence is continually or periodically maintained for a change in presence.

After a period of time of the user operating the computer (101) (and the aforementioned NPS monitoring), NPS detects a change (207) in human presence at the computer (101). Generally, this is following a period during which a human was consistently detected as being present. When NPS detects that the authenticated human is no longer present (207) at the computer (101), the computer (101) may then perform one or more security actions (209). This action will vary from embodiment to embodiment, and from circumstance to circumstance, and may depend upon the particular security settings of the computer (101).

These settings may be provided by the user of the computer (101), or established by an administrator or other device management organization. For example, if the computer (101) is the property of a company, and has been issued to an employee for company use, the information services department of the company may set security policies. Where the computer (101) is owned by or managed by the user directly, the user may set the security policies. These policies are generally represented in configuration and setting data, as will be familiar to a person of ordinary skill in the art.

Generally, the security action (209) comprises one or more of two major categories of actions—inhibiting access to the computer (101) and/or its data, or inhibiting use of networking hardware. The security actions (209) may range from automatically locking the computer (211), to requiring re-authentication (213), to disabling certain features of the computer. Re-authentication (213) has the advantage of requiring that proper authentication credentials be entered (203) by a person physically proximate to the computer, which allows the use of NPS to once again confirm the presence of an authorized user (205), thus restarting the loop.

As another example, when the user is no longer at the computer (101) as detected by NPS (207), the computer (101) may take a security action (209) to automatically disable all network access hardware. This may include the transceiver (102). Alternatively and/or additionally, the computer (101) may automatically disable all network access hardware at the hardware level, inhibiting remote attacks from being carried out on the system.

In an embodiment, other security actions (209) may be taken in conjunction with, or alternatively to, NPS. By way of example and not limitation, manual user input may be used to determine the presence or absence of a human at the computer (101). For example, the user may set an alarm when he or she departs to indicate absence. Also by way of example, the use of cameras, microphones, weight plates, or other sensors, may be used to determine that a human is present at the computer (101).

Figure 4B:
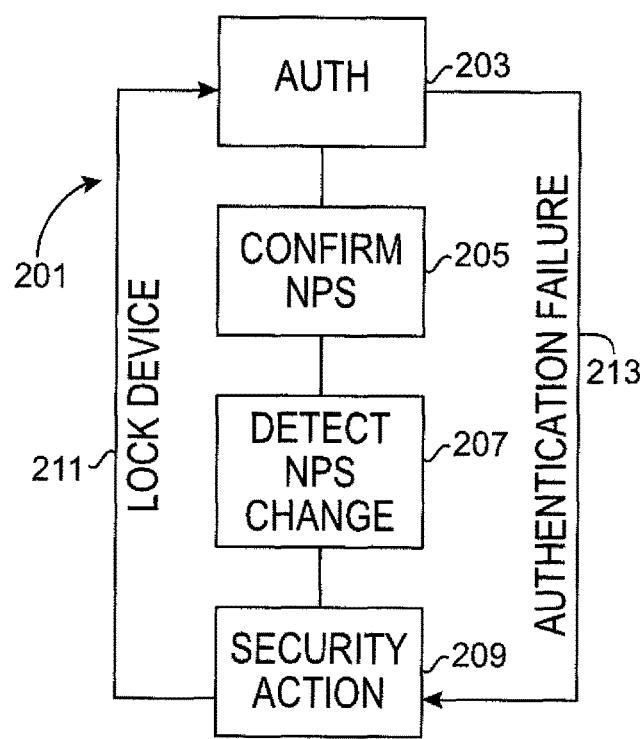

In an embodiment, after the security action (209) is taken, NPS continues to operate until a human is once again detected present at the computer. In the depicted embodiment in FIG. 4B, when a human is detected, the computer (101) may prompt the user to reenter authentication credentials (203), requiring the newly detected human to establish that he or she is an authorized user of the computer (101). If the human fails to establish that he or she is an authorized user, the computer (101) may refuse access, or take a second security action (209). This second security action (209) may be the same, or different, from a previously taken security action (209). For example, the computer (101) may encrypt sensitive information, enable wireless connectivity long enough to transmit a warning signal, or, in extreme cases, delete sensitive information.

Because most attacks rely on the use of network access to be successful, a typical security action (209) to disable wireless network access at the hardware level, meaning electrical power to the networking hardware is discontinued. This prevents the antenna from being energized to send or receive signals at all when no human is detected as present at the computer, resulting in the computer (101), even if compromised by an intruder, being rendered mostly useless for an attack. As an example, for a botnet type infection, this security measure increases the cost to infect a computer (101), since it may only be infected while a human is present, while also reducing the benefit an attacker may gain from infecting the computer system, since it may only participate in said botnet when a human is present. As a result, such attacks become less lucrative and more difficult, which would result in a reduction of the prevalence of attacks in general.

It is important to understand the difference between disabling the hardware at the "hardware level" versus disabling at the "software level". Disabling at the software level generally means disabling driver software used to operate the networking hardware (102) or filtering access based on certain rules or policies. By way of examine and not limitation, a blacklist or whitelist approach may be used, where communications to or from certain Internet Protocol (IP) addresses (or address ranges) is disallowed while no human is detected as being present at the computer. Alternatively, traffic may filtered at the packet level based on source or destination port, protocol type, characteristics of payloads, originating application, address. These are typical operating system functions that usually can be carried out using standard system administration and configuration software. This approach provides significant flexibility in the specific security action taken, but has certain limitations when facing a sophisticated attack.

A limitation of software disconnections is that an attacker could re-enable the drivers or modify the filter rules or policies. With a hardware disconnect, the physical ability to utilize the network hardware (102) at all is eliminated. This means that no amount of software tampering can reenable wireless access. From the point of view of the operating system, the wireless card (102) is simply not present. As will be understood by a person of ordinary skill in the art, disabling at the hardware level would generally require specialized hardware specifically configured and designed to support this function.

Figure 5:
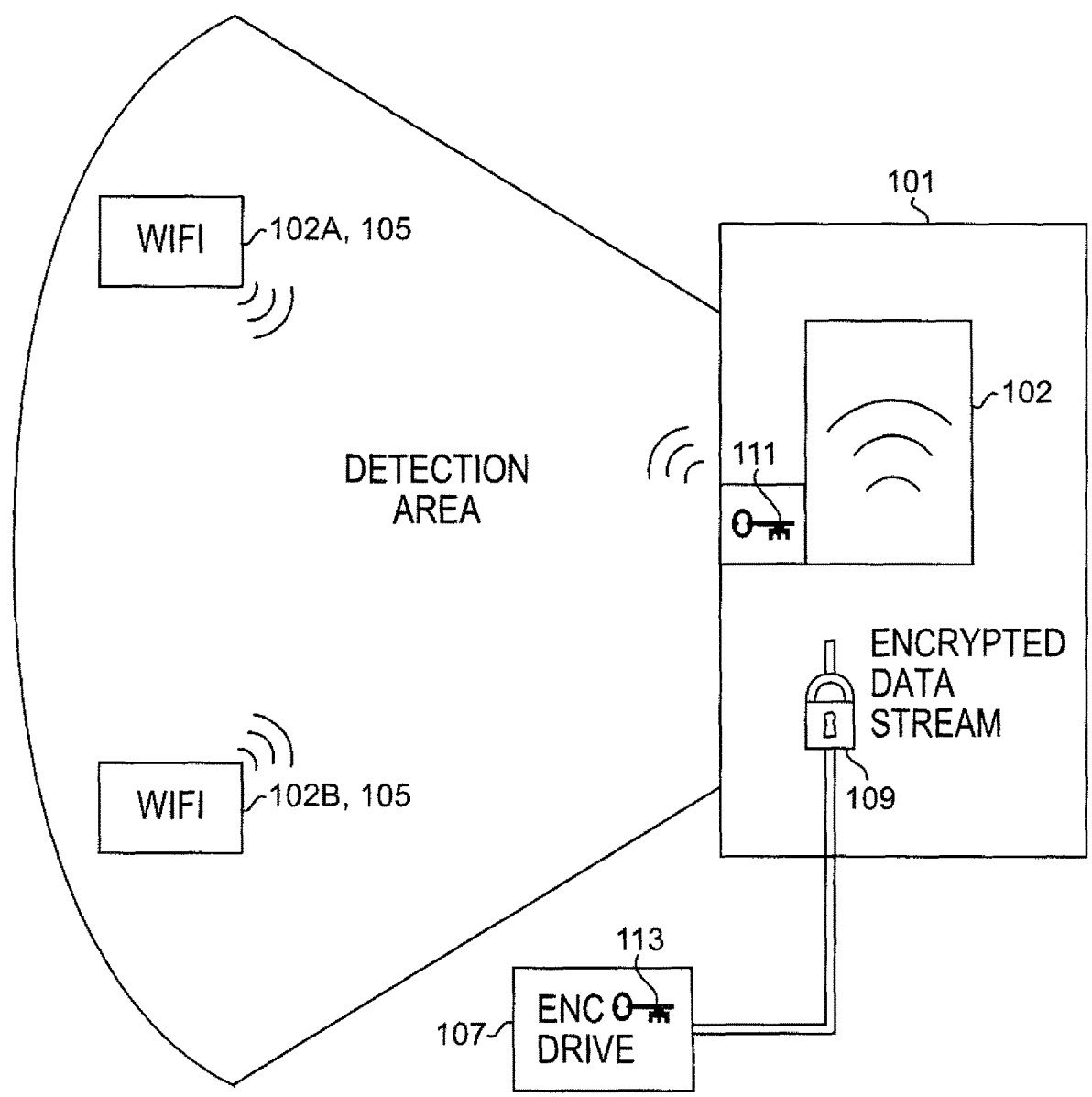
FIG. 5 depicts an embodiment of systems and methods to provide conditional access to a resource.

In an embodiment, the security action (209) may comprise encrypting and/or decrypting sensitive information. By way of example and not limitation, this may comprise encrypting and/or decrypting specifically designated folders, drives, or data files. In the depicted embodiment of FIG. 4B, when no user is detected at the computer (207), the decryption key required to decrypt the encrypted information is disabled and/or removed, preventing access or use of the encrypted information. When a user is detected at the computer (205), this key is once again made available, and the encrypted information can be decrypted for access and use. This allows flexibility in that certain portions of the computer (101) are still usable as normal without requiring presence in the detection area. In an embodiment, the systems and methods provide conditional access to encrypted data. An exemplary embodiment is depicted in FIG. 5. In the depicted embodiment of FIG. 5, an encrypted storage medium (107) contains encrypted data decryptable using a key (111). This data is available, encrypted, via a data stream (109). In encrypted stream (109) format, the data is essentially unusable until decrypted using the key (111). The key (111) is stored on or otherwise available to the computer (111). In the depicted embodiment, the security action (109) comprises revoking access to the key (111), rendering the stream (109) unusable. The key (111) thus only is accessible while presence of an user is detected in the detection area. Optionally, the system could determine that the user is authorized by requiring a password to permit access to the medium (107) or to the key (111).

Other keys may also be managed in this fashion. For example, keys may be used to sign transactions for a public ledger system, such as a blockchain. A blockchain wallet is often stored on a removable media, such as thumb drive, and connected to the computer (and thus, connected to the network) only when needed for a transaction. In this state, the wallet is known as a "hot wallet," and, for security reasons, cryptocurrency users generally only connect the wallet when necessary for transactions. A wallet that is not connected is a "cold" wallet and is invulnerable to hacking while disconnected. However, a "cold" wallet is inconvenient because the user must keep track of a physical removable media device, which can be lost or stolen, and remember to plug it in and remove it to gain the security advantages. This is annoying, inconvenient, and introduces risk of the media being misplaced, and the wallet being lost.

One embodiment of the systems and methods described herein facilities use of a wallet with the convenience of a hot wallet when a user is detected (205) as being present at the computer, and the safety of a cold wallet when no user is detected as being present at the computer. This could be done, for example, by storing a private key (113) on an encrypted medium (107) that can only be decoded using the key (111) when an authorized user is detected (205) as being present.

Many variations of this embodiment are possible. For example, the method for allowing access to the medium (107) may not require encryption and decryption, but rather, may simply provide or withhold electrical power to the medium (107). Similarly, the encrypted medium (107) may not be an entire physical drive, but may instead be a partition, folder, or other subdivision of a physical drive.

Figure 6:
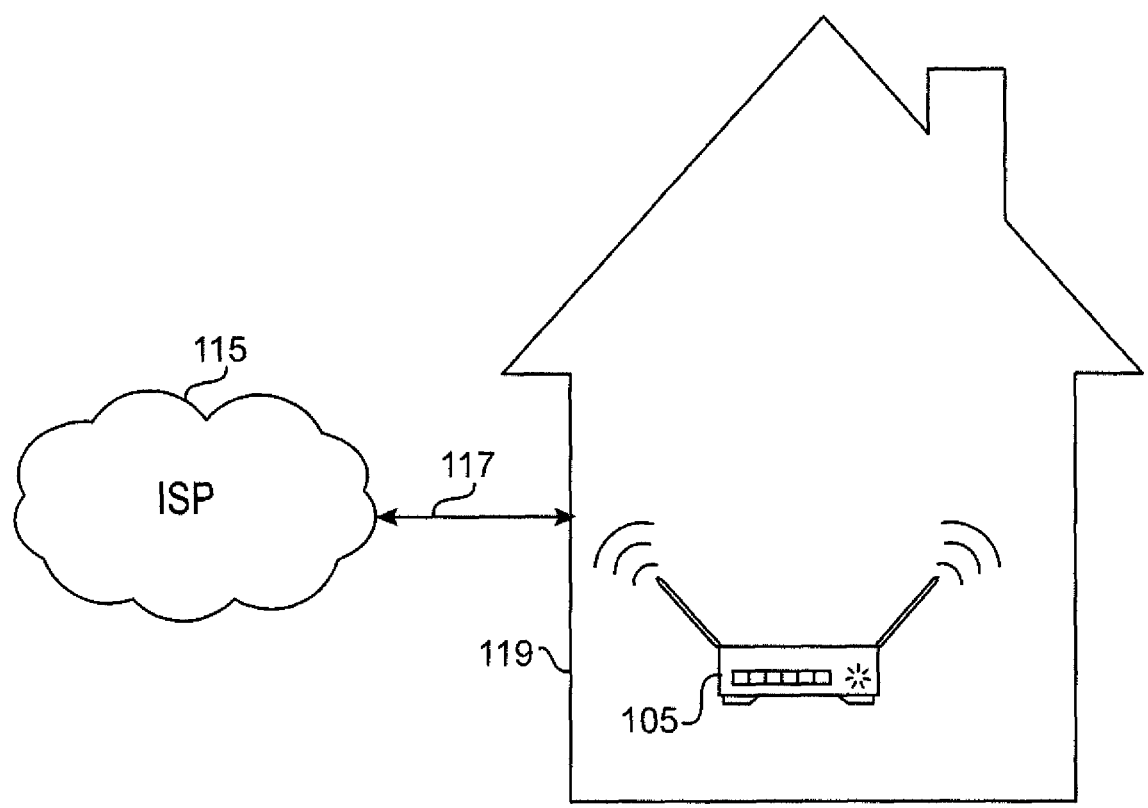
FIG. 6 depicts an embodiment of the systems and methods described herein at a facility level to filter network traffic.

This concept may be used at a facility level. An exemplary embodiment is depicted in FIG. 6. In this embodiment, residential internet access is provided via an internet service provider (115) (ISP). The ISP (115) may determine whether Internet access (117) is permitted for a given subscriber based at least in part on whether the associated residence (119) is contemporaneously detected using NPS as being occupied. While the dwelling (119) is detected as unoccupied, the ISP (115) may conduct certain filtering of transmissions to or from the home (119), such as disallowing connections of any kind, allowing only connections from trusted sources (e.g., whitelist strategy), which may be defined by the ISP, user, or both, or disallowing connections from specific sources (e.g., blacklist strategy), or suspect sources as defined by the ISP, user, both, or a third party. Additionally, or alternatively, some combination of these strategies may be used. This can prevent or reduce risk of a remote threat while allowing normal usage while users are home (119). Additionally and/or alternatively, other methods of determining presence and/or identity as an authorized user may be used; for example, disarming a house alarm with a confidential code could demonstrate the presence of an authorized user.

For example, when users are detected as being present at home (119), and traffic (117) from an interactive video game company is detected to or from the home (119), such traffic (117) would be allowed because it is presumed that the detected users at home (119) are playing the game. However, if no users are detected as being present at home, and connections are detected to or from the house (119) from an interactive service of this kind, the traffic may be blocked, because an unoccupied home (119) would have nobody in it who could be playing an interactive video game. Thus, it is more likely that this traffic (117) is malicious at worst or erroneous at best.

In either case, there is a justification for inhibiting or disallowing the traffic entirely. For example, the user may have an unauthorized intruder in the home that has not been detected. Alternatively, the computer system may be compromised and the malicious software may be piggy-backing its activities on a known game or other innocuous protocol, such as through a modification, packet sniffer, man-in-the-middle attack, and so forth. A third possibility is that the software itself is operating without modification but is inherently vulnerable and has been infected with malware of which its publishers are unaware. Conversely, hacking attempts from outside to infect a computer in the home, or to scan the home computers or otherwise transmit viruses or other malware, can be thwarted without interfering with normal operations. Additionally, when the house is unoccupied, the traffic is blocked, therefore unattended machines cannot be used as zombies in a botnet. Yet another benefit is that behavior information can be used to flag a service as potentially suspicious and create a warning to users, ISPs, service creators, or any other parties, so that they can act to resolve the root issue. By way of example and not limitation, such behavior information may include changes to traffic characteristics generated by a particular program or computer. If, for example, a game ordinarily produces, on a regular basis, a certain amount of network bandwidth, but unexpected begins to consume far more, it might be inferred that the sudden and unexpected change in behavior is caused by malicious programming.

Still other implementations of this principle are also possible. For example, the computer in a given facility, which may be a commercial or business building, or a home, may be connected to a home automation system and receive inputs from that system concerning the occupancy of the facility. For example, a room or office containing the computer in question may include occupancy sensors, such as motion sensors within the room, or sensors that detect whether the door is open or closed. If a change in the occupancy state is detected by such a system showing that the office in which the computer is located is no longer occupied (e.g., the motion sensor detects motion in the room, followed by no motion, or a door that is opened is detected as being closed), this information may be provided to the computer, which may immediately respond with a change to its security state or other operation of automation systems (e.g., lighting, HVAC, etc.).

For example, the computer may immediately go into a lock screen, or a sleep or standby mode. In this fashion, presence indicators are used to protect the computer from threats in a more immediate and responsive way than do current systems. For example, the two major forms of physical computer security in use now are manually locking, which users generally forget to do, or locking after a predetermined time out. However, predetermined time outs still run the risk of a given computer being available in an unlocked and unsecure state for some amount of time unattended. Further, even when such devices become locked, they do not currently require a second factor to be unlocked. This second factor of human presence would be provided by the invention described herein.

An additional benefit of this system is that access to the computers may be disabled, while the computer acts as a node in the network presence sensing system as described in the patent applications referenced above. In such an embodiment, energy savings commands may be distributed to or from the computer system which will result in energy savings by disabling the computer when nobody is present. This prevents the problem of timeouts continuing to have the computer running and wasting energy when it is not in use and nobody is present at it.

Another use of this system is to provide information in a computing pool. A computing pool can be generally thought of as pool of computers ordinarily used by individual users in which unused computing power may be shared. For example, when any given user is done working for the day, the processing potential of that user's computer is essentially wasted, even while others continue to work and experience latency and slowdowns due to inherent processing throughput limitations. This is particularly true for computationally intensive industries. In a computing pool, all participating computers can share idle processing capacity to assist with high processing loads experienced by other computers in the pool. When each computer in the pool is being used directly (e.g., a user is detected as being present at the computer), it may be automatically removed from the computing pool to ensure that the designated user has full access to its processing facilities. However, when the user departs and is no longer detected as present at the computer, the computer may be added back to the pool so that its idle processing power may be utilized by others. This is an improvement over current methods in the art, which generally use some combination of schedules, time since last user interaction, and resource utilization, to determine when to add or remove a given computer to or from the computing pool. By detecting presence at the computer, individual computers can be correctly managed in a computing pool in real-time or near real-time with the arrival and departure of the designated user for each computer. This approach would improve resource utilization and reduce waste.

As should be clear to one of ordinary skill in the art, the above embodiments can be varied in a number of ways. By way of example and not limitation, the method of detecting an user is nearby, the optional method of detecting whether a user is authorized and the actions taken may all be varied. As noted in some of the above embodiments, many different methods can determine the presence of a user such as: NPS (with or without the computer being part of the presence sensing network), PIR sensors, weight plates, cameras, and/or microphones. Similarly, many different methods can determine that the user is authorized, such as: a password entered at the computer, disarming an alarm, or biometric information as determined by a sensor (note that this could be the same sensor that detected presence, such as an NPS sensing network, a camera or a microphone). Finally, many different actions may be taken, such as: locking a computer, changing the power state of the whole computer or a particular piece of hardware, changing firewall settings, disabling a driver, encrypting a file or a drive; note that these actions may extend beyond security to provide other benefits, such as power savings, more predictable bandwidth utilization, or to inform a controller about the computer's availability in a computing pool.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

The invention claimed is:

1. A method for securing an unattended computer system comprising:
   providing a computer having a radio transceiver, said radio transceiver being used to provide said computer wireless signals comprising data, said data transferring between said computer and a wireless communication network;
   providing a human user in physical proximity to said computer, said user using said computer and said wireless communication network to send said data between said computer and said wireless communication network;
   said human user manipulating said computer to provide authentication credentials for said human user to access said computer;
   validating, at said computer, said authentication credentials;
   detecting, when said authentication credentials are validated, said physical proximity to said computer of said human user, said detecting comprising Network Presence Sensing (NPS) using said radio transceiver, said NPS comprising:
      obtaining signal data, said signal data comprising data about properties of said wireless signals; and
      comparing said signal data against a baseline signal profile of signal data, said baseline signal profile indicating signal data when no human user is at said computer;
   repeating said detecting step until said human user is no longer detected in physical proximity to use said computer; and
   after said human user is no longer detected in physical proximity to use said computer, securing said computer from unauthorized use.

2. The method of claim 1, wherein said securing said computer from unauthorized use comprises said computer executing a security action.

3. The method of claim 2, wherein said security action comprises locking said computer.

4. The method of claim 3, wherein said disabling said radio transceiver comprises discontinuing electric power to said radio transceiver or network hardware, and said disabling said network hardware of said computer comprises discontinuing electric power to said network hardware.

5. The method of claim 2, wherein said security action comprises setting said computer to sleep mode.

6. The method of claim 2, wherein said security action comprises disabling access to a digital wallet.

7. The method of claim 1, further comprising:
   after said securing said computer from unauthorized use, a second human user manipulating said computer to provide second authentication credentials for said second human user to access said computer;
   determining that said second authentication credentials are invalid;
   after said determining that said second authentication credentials are invalid, further securing said computer from unauthorized use.

8. The method of claim 7, wherein said human user and said second human user are not the same.

9. The method of claim 7, wherein said further securing said computer from unauthorized use comprises said computer executing a security action.

10. The method of claim 9, wherein said security action comprises locking said computer.

11. The method of claim 10, wherein said disabling said radio transceiver comprises discontinuing electric power to said radio transceiver or network hardware, and said disabling said network hardware of said computer comprises discontinuing electric power to said network hardware.

12. A system for securing an unattended computer system comprising:
   a computer having a manually operable interface for receiving user input, a radio transceiver, said radio transceiver being used to provide said computer wireless signals comprising data, said data transferring between said computer and a wireless communication network because of said user input, a microprocessor, and a non-transitory, computer-readable storage medium having stored thereon program instructions which, when executed by said microprocessor, cause said computer to perform the steps of:
      receiving, via said interface, user input comprising authentication credentials for a human user to access said computer;
      validating said authentication credentials;
      detecting, when said authentication credentials are validated, said physical proximity to said computer of said human user, said detecting comprising Network Presence Sensing (NPS) using said radio transceiver, said NPS comprising:
         obtaining signal data, said signal data comprising data about properties of said wireless signals; and
         comparing said signal data against a baseline signal profile of signal data, said baseline signal profile indicating signal data when no human user is at said computer;
      repeating said detecting step until said human user is no longer detected in physical proximity to use said computer; and after said human user is no longer detected in physical proximity to use said computer, securing said computer from unauthorized use.

13. The system of claim 12, wherein said securing said computer from unauthorized use comprises said computer executing a security action.

14. The system of claim 13, wherein said security action comprises locking said computer.

15. The system of claim 14, wherein said disabling said radio transceiver comprises discontinuing electric power to said radio transceiver or network hardware, and said disabling said network hardware of said computer comprises discontinuing electric power to said network hardware.

16. The system of claim 13, wherein said security action comprises setting said computer to sleep mode.

17. The system of claim 12, wherein said program instructions, when executed by said microprocessor, further cause said computer to perform the steps of:

after said securing said computer from unauthorized use, receiving, via said interface, second user input comprising second authentication credentials for a second human user to access said computer;

determining that said second authentication credentials are invalid; and after said determining that said second authentication credentials are invalid, further securing said computer from unauthorized use.

18. The system of claim 17, wherein said further securing said computer from unauthorized use comprises said computer executing a security action.

19. The system of claim 18, wherein said security action comprises locking said computer.

20. The system of claim 19, wherein said disabling said radio transceiver comprises discontinuing electric power to said radio transceiver or network hardware, and said disabling said network hardware of said computer comprises discontinuing electric power to said network hardware.

* * * * *